United States Patent
Nietsch et al.

(10) Patent No.: US 7,659,020 B2
(45) Date of Patent: Feb. 9, 2010

(54) POWER SUPPLY PLATE FOR A COPLANAR CIRCUIT FUEL CELL

(75) Inventors: Thomas Nietsch, Aix en Provence (FR); Olivier Verdu, Aix en Provence (FR)

(73) Assignee: Helion, Aix en Provence Cedex (FR)

( * ) Notice: Subject to any disclaimer, the term of this patent is extended or adjusted under 35 U.S.C. 154(b) by 458 days.

(21) Appl. No.: 10/581,869

(22) PCT Filed: Dec. 14, 2004

(86) PCT No.: PCT/FR2004/050689
§ 371 (c)(1), (2), (4) Date: Jun. 5, 2006

(87) PCT Pub. No.: WO2005/060032
PCT Pub. Date: Jun. 30, 2005

(65) Prior Publication Data
US 2007/0111063 A1 May 17, 2007

(30) Foreign Application Priority Data
Dec. 15, 2003 (FR) .................................. 03 51054

(51) Int. Cl.
*H01M 8/04* (2006.01)
(52) U.S. Cl. .............................. 429/26; 429/34; 429/38; 429/39
(58) Field of Classification Search .................... 429/26
See application file for complete search history.

(56) References Cited

U.S. PATENT DOCUMENTS 5,804,326 A 9/1998 Chow et al.

FOREIGN PATENT DOCUMENTS

| FR | 2 810 795 | 12/2001 |
| JP | 2000-067855 | * 3/2000 |
| JP | 2000-67885 | 3/2000 |
| JP | 2000-228207 | 8/2000 |

* cited by examiner

*Primary Examiner*—Dah-Wei D Yuan
*Assistant Examiner*—Jacob Marks
(74) *Attorney, Agent, or Firm*—Pearne & Gordon LLP

(57) ABSTRACT

The bipolar plate is thinner because it includes in a single plane all of the channels (21) for circulation of the oxidiser, the fuel and the coolant fluid (41).

The feed plate, which is preferably made of a composite material, has on each of its faces (1A, 1B) a network of channels for the circulation either of oxidiser or fuel, which are supplied through feed apertures (2, 3) passing through the plate. Refrigeration is achieved by means of feed apertures (4) feeding into one or more refrigeration channels (41) positioned between the parts of the circulation channels (21) for the oxidiser or the fuel. Possible through passages (43) allow these different channels to pass from one face to the other so as to organise the circulation and the removal of these three fluids. It is thus possible to distribute the oxidiser and the fuel to both sides of the plate, while also arranging its refrigeration.

Application to fuel cells of average and high power.

16 Claims, 4 Drawing Sheets

POWER SUPPLY PLATE FOR A COPLANAR CIRCUIT FUEL CELL

FIELD OF THE INVENTION

The invention concerns the area of fuel cells that are composed of a stack of a large number of stages, each including a basic element which in turn is composed of a separating membrane placed between two electrodes, themselves placed between two polar or bipolar plates.

This type of fuel cell can find its application in many areas of activity, including in both military and civil sectors. The military applications include, in particular, underwater propulsion, mobile electric generators and low-power units as a replacement for batteries. The military or civil applications include, amongst other things, the transportation area, for the propulsion of urban public transport vehicles for example, such as buses, trams, trolley buses and so on. Applications for motor vehicles, trucks and trains are also envisaged. Other stationary applications are also possible, in particular on stationary systems for the local production of electricity, like those used in hospitals and others service buildings where the possibility of an interruption to the electrical power supplies must be excluded. Finally, other potential applications exist in the area of the portable and miniaturised devices.

PRIOR ART AND THE PROBLEM POSED

The fuel cell is an electrochemical device which converts the chemical energy of a fuel, of the renewable type in certain cases, into electrical energy. The operating principle of this electrochemical generator depends on the reaction of electrochemical synthesis of water. Many fuel cells are composed of a succession of stages, each including a basic element composed of two electrodes, one an anode and the other a cathode, to which are continuously supplied an oxidiser, such as oxygen from air, and a fuel such as hydrogen, which remain separated by an ion-exchange membrane acting as an electrolyte. At the anode, the fuel undergoes catalytic oxidation which, in the case of a fuel cell of the proton exchange membrane type, releases protons and electrons. The electrons travel along the external electrical circuit, while the protons are transported in the electrolyte to the cathode, where they recombine with the electrons and the fuel, under the effect of catalytic reduction to produce water. These two operations are accompanied by the establishment of a potential difference between the two electrodes.

The efficiency of the fuel cell, in theory slightly less than 100%, reaches values greater than those of the internal combustion engine. Moreover, the fuel cell is quiet and virtually non-polluting, even though the fuel is an organic compound. This high efficiency, and the low production, are some of the reasons for research and development in this area.

The various types of fuel cell can be defined by the nature of the electrolyte constituting the membrane. One of the most advanced types of fuel cell in the temperature area below 100° C. is that of fuel cells with a polymer electrolyte. This present invention relates to the area of fuel cells of the PEM type (proton exchange membrane), in which the electrolyte is a proton exchange membrane.

Mechanically, the fuel cell is composed of a stack electrochemical cells constituting a stage, each cell being composed of polar or bipolar separating plates between which a basic EME element (Electrode, Membrane, Electrode) is sandwiched. Such an arrangement of basic cells constituting the core of a fuel cell is known by those skilled in the art as a "stack".

In a stack of fuel cells of the PEM type, the separating plates, called bipolar plates, also perform the function of reagent gas distribution, composed of oxygen or air and hydrogen, as well as collection of the electrons produced, and removal of products of the reaction, in particular the water. Each bipolar plate is in contact, at one of these faces, with an anode of a basic element N, and at the other face with a cathode of a basic element of rank N+1.

Finally, in high-power fuel cells, a last function of these polar or bipolar plates is the refrigeration of the whole stack by the circulation of a coolant liquid between the different basic cells of the fuel cell. The coolant fluid flows in channels which are specifically designed and integrated into the polar or bipolar plates. It can be seen that this refrigeration may not be applied to all the stages, but rather in a periodic manner in the stack.

The French patent application published under the number FR-2 810 795 describes a bipolar plate which performs the distribution of the oxidiser and the fuel to its two faces by means of two circulation channels. At the middle of the skeleton of this bipolar plate, between two metal plates, the circulation of the coolant fluid is organised. These bipolar plates have a substantial thickness due to the design, which requires that the circulation, firstly of fuel and oxidiser and secondly of liquid coolant do not interfere. This is why they are placed in different respective planes.

The thickness of this bipolar plate, like those of many other cells, is therefore high.

The objective of the invention is to remedy this drawback by proposing a different type of polar or bipolar plate.

BRIEF DESCRIPTION OF THE INVENTION

To this end, the principal subject of the invention is a feed plate to at least one cell of a fuel cell, that includes:
- apertures for the feeding of fuel, oxidiser and coolant fluid;
- two opposite faces on at least one of which there are channels for circulation of the fuel or the oxidiser; and
- at least one refrigeration channel located on the same face or faces as that or those on which the channels for circulation of the fuel or oxidiser are located, so as to be coplanar with these circulation channels, where the feed plate thus has a minimalised thickness, and with the refrigeration taking place at the heart of the active area. It is therefore more effective.

According to the invention, the first channels for respective circulation of the fuel and oxidiser are located on the two faces of the plate, with the refrigeration taking place on both faces of the plate, when the plate thus constitutes a bipolar plate, with a single refrigeration channel being located on both faces at once and, as a consequence, having several passages through the plate from one face to the other, as well as branches.

In the main embodiment of the invention, the entrance and the exit of the refrigeration channel is placed on the face opposite to that where this refrigeration channel is located, with the latter passing through the thickness of the plate.

It may prove advantageous to group together the apertures for feeding the oxidiser, fuel and coolant fluid and the entrances and exits of the circulation and refrigeration channels in one set position on the plate.

Concerning the sharing of different channels on the face or faces of the plate, it can be arranged that the trajectories of the circulation channels and of the refrigeration channel or channels should be interleaved in relation to each other, thus following the same path.

A preferred trajectory of the circulation channels of the plate according to the invention is designed so that the latter is a zigzag path.

Concerning the trajectory of the circulation channels, it is also possible that these should be parallel to each other, so as to form a comb-like structure.

In a preferred embodiment of the refrigeration channel or channels, the latter have branches whose entrances and exits are spaced over much of the length of the plate.

A particular feature of this implementation may be that the orientation of the channels should be offset by 90° at one face in relation to the other.

In these latter cases, it is arranged that the passage through the plate by the refrigeration channel takes place at the end of each branch, with a change of orientation of 90° C. for the refrigeration channel at the passage through the plate.

In one particular embodiment of the plate according to the invention, the latter takes the form of a corrugated plate, so as to form first channels for circulation of the fuel on a first face interleaved with parallel refrigeration channels on a first face, and channels for circulation of the oxidiser interleaved with parallel refrigeration channels, so that the channels on the first face form separations for the channels on the second face and vice versa, with all the channels located in the same plane, and with the plate then constituting a bipolar plate.

In this case, the plate is composed mainly of a corrugated sheet possibly surrounded by a frame which is pierced by feed apertures.

In different embodiments, it is arranged that that the refrigeration channels or their branches are placed between several channels for circulation of the oxidiser or fuel.

In a method of operation of the fuel cell using the plate according to the invention, the coolant fluid is preferably water.

In a preferred embodiment of the plate, the latter is made from a polymer-graphite composite material.

THE FIGURES

The invention and its various technical characteristics will be better understood on reading the following description, with reference to figures which show:

FIG. 1, in perspective section, one example of embodiment of the feed plate according to the invention;

DETAILED DESCRIPTION OF ONE EMBODIMENT OF THE INVENTION

Figure 1:
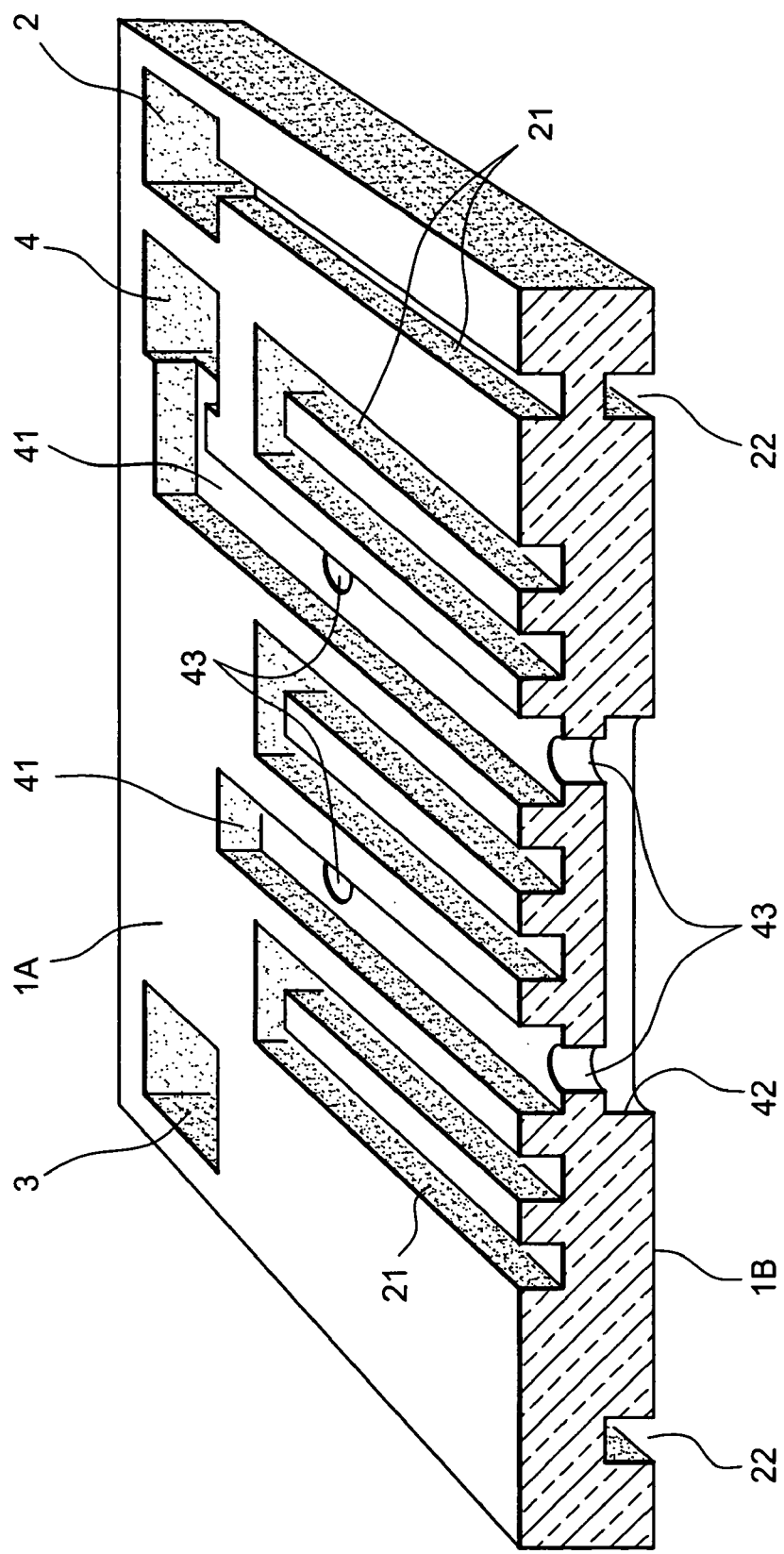

FIG. 1 enables one to understand the design of the feed plate according to the invention by observing the cross-section of a preferred embodiment of this plate. In this case, the latter is manufactured from graphite and, before the completion of its manufacture, has two plane faces which are machined during the manufacture of the latter so as to create the two faces, 1A and 1B.

A first face 1A has been shown in particular, though in part only. In fact, at the four corners of the latter there is a feed hole 2 or 3 for oxidiser or fuel. On this first face 1A, the oxidiser feed hole 2 feeds into an oxidiser circulation channel 21, where this canal snakes over the area 1A so as to visit the largest central part of the latter. In addition, a coolant-fluid feed hole 4 is also placed at the periphery of the plate, and feeds into a refrigeration channel 41 running along the spaces left by the oxidiser feed channels 21.

It can be seen that in most cases, the choice as to whether the oxidiser or the fuel should flow in one or other of the two faces is of no importance.

The second face 1B, is of similar design, but oriented at 900 in relation to the orientation of channels on the first face 1A, which explains the dearth of channels shown on this second face 1B, because of the fact that the figure is in section. In fact, a second fuel circulation channel 22 has been shown symbolically, but the latter is oriented in a direction perpendicular to its true orientation. A branch 42 of the refrigeration channel 41 is shown at the centre of the plate and opens onto the second face 1B. This is fed at its two extremities by orifices 43 which cause it to communicate with the parts of the canal 41 located on the first face 1A.

Figure 2A:
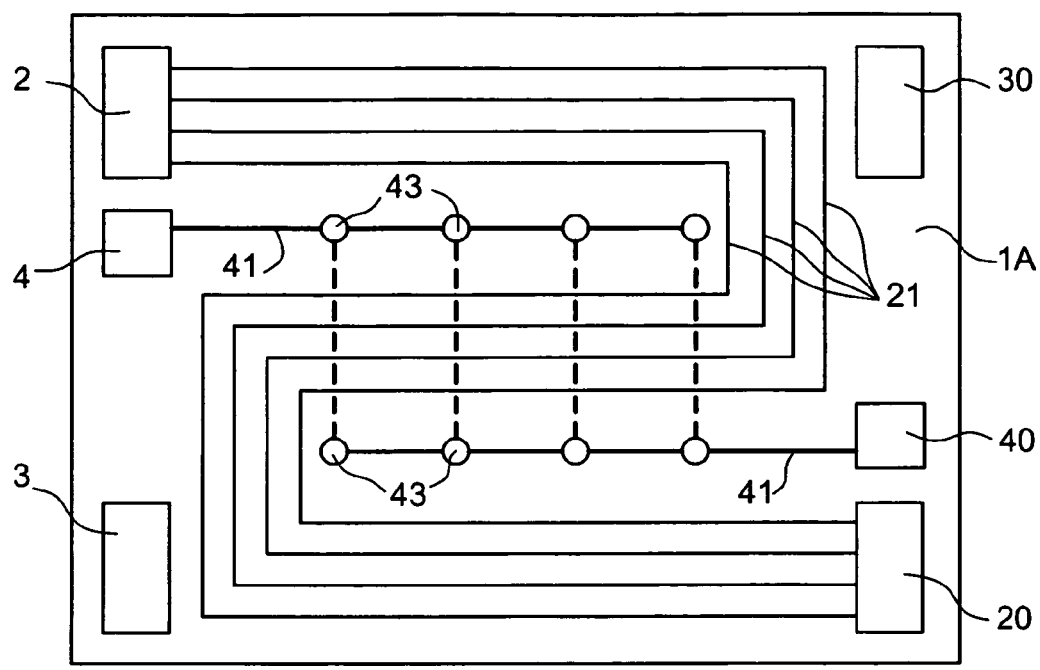
FIGS. 2A and 2B are two diagrams representing the layout of channels on a feed plate according to the invention, as shown in FIG. 1.
Figure 2B:
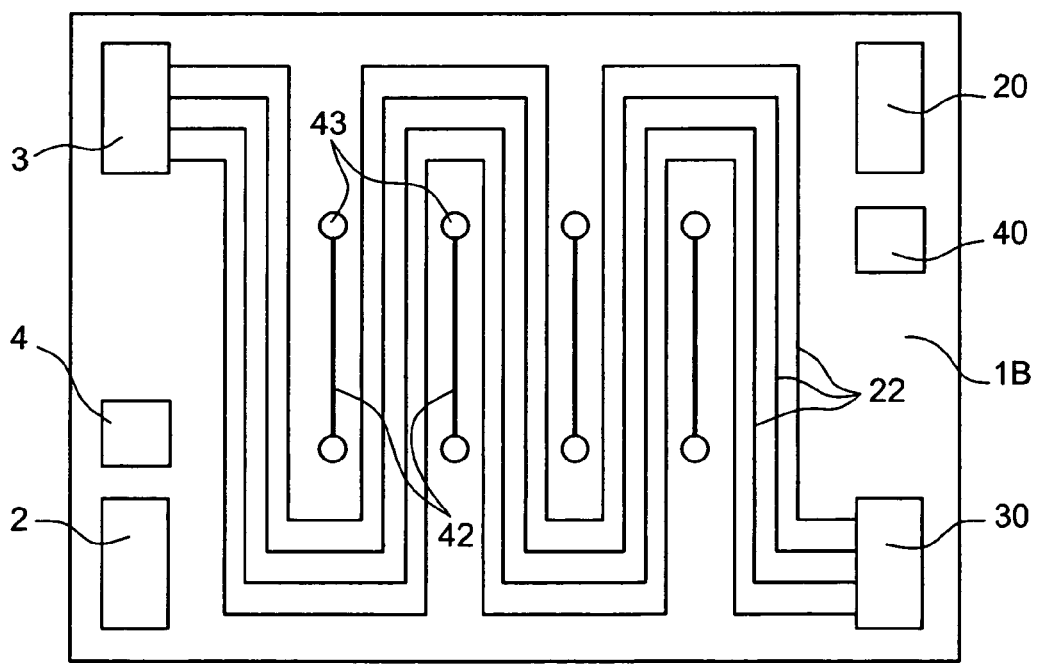

Referring to FIGS. 2A and 2B, it is easier to understand the relative organisation of these two faces 1A and 1B. In fact, on FIG. 2A, the first face 1A of the plate is represented schematically. Here we see the apertures for the feeding of oxidiser 2, fuel 3 and coolant fluid 4, as well as the oxidiser circulation channels 21, and the refrigeration channel 41. These circulation channels travel over most of the plate, executing one or more zigzags. At the middle of two of these zigzags of opposite direction, are located the start and end of branches of the refrigeration channel 41, which lie parallel to the orientation direction of the circulation channels 21. It can be seen that these branches of the refrigeration channel 41 are equipped with through holes 43.

Turning over the plate according to the invention, shown at FIGS. 1 and 2A, we see the layout represented by FIG. 2B. However, the circulation channels 22 now concern the fuel, and connect the fuel feed hole, at the entrance end, to the fuel feed hole 30 at the exit end. The feed apertures 2 and 20 are shown here in FIG. 2B, but are not connected to the first circulation channels.

It can be seen that the orientation of the zigzag constituting the trajectory of these circulation channels 22 is offset by 900 in relation to those on the first face 1A.

It can be seen that the branches 42, already shown on the face 1B of FIG. 1, are located between the zigzags of the first circulation channels 22. At each of their ends, there is a through passage 43 which enables these branches 42 to be linked to the remainder of the refrigeration channel 41.

FIGS. 2A and 2B show a channel layout in zigzag form, but by using the branches 42 of the refrigeration channel 41, it is possible to imagine that the trajectory of the circulation channels 22 may not be in zigzag form, but in the shape of a comb, with the different branches of the channel(s) 22 then being parallel to each other and in relation to the branches 42 of the refrigeration channel 41.

The feed plate described with reference to FIGS. 1, 2A and 2B, therefore allow the circulation of oxidiser and fuel respectively on its two faces. The feed plate is therefore of the bipolar type.

Figure 3A:
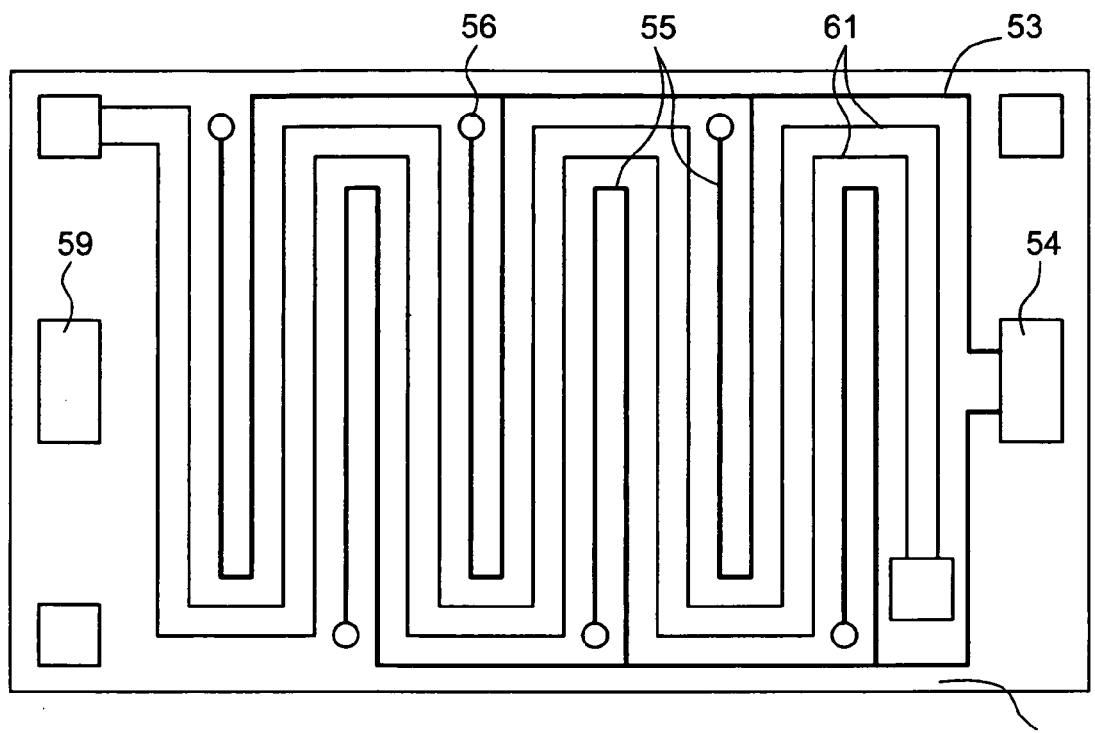
FIGS. 3A and 3B show the channel layout in a second embodiment of the feed plate according to the invention.
Figure 3B:
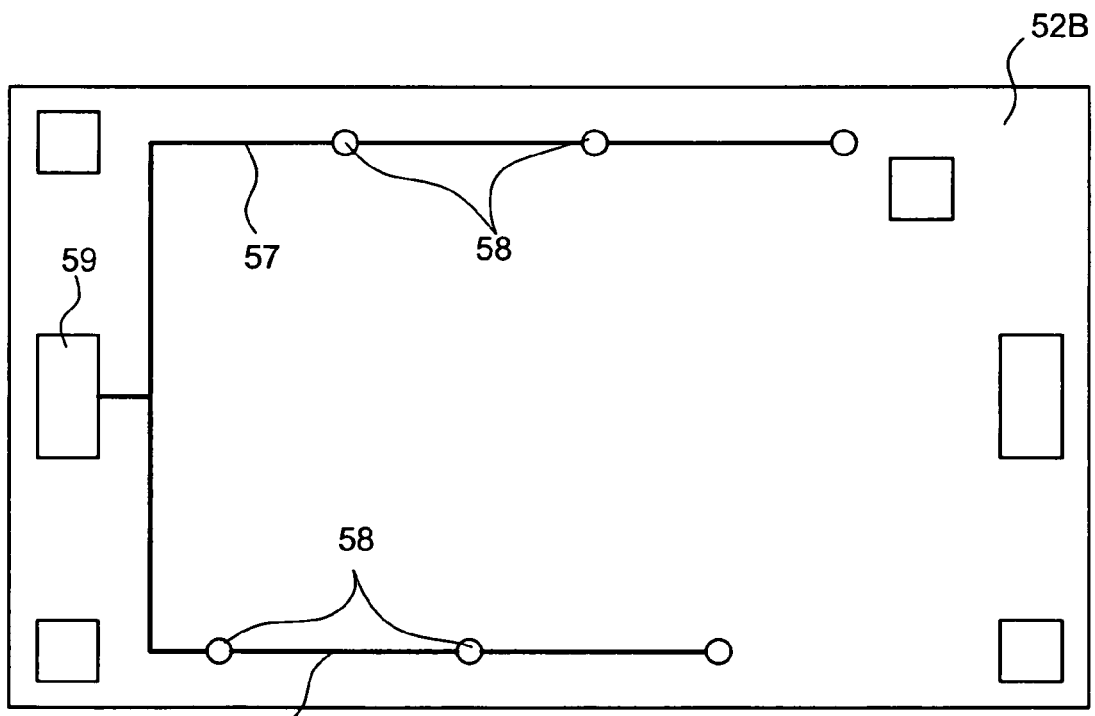

With reference to FIGS. 3A and 3B, it is possible that the feed plate may be only of the monopolar type. The example described by these two FIGS. 3A and 3B shows that a single face, here face 51A, has only circulation channels 61. This same face 51A also has a refrigeration circuit in the form of a feed hole 54 for coolant fluid and two lateral refrigeration channels 53 with several branches 55, parallel to the parallel parts of the first circulation channels 61 which run in the form of zigzags. The branches 55 each run in the space formed by a loop of the zigzag run of the circulation channels 61, and in an alternating manner on either side of the plate. In this implementation, each branch 55 does one return trip over the width of the plate, passing through it at its end 56.

Referring to FIG. 3B, it can be seen that the second face 52B has as its single canal the end and the exit of the refrigeration channel 53, in particular two branches 57 which allow it to be connected, by means of through passages 58, to the other part of the refrigeration channel 53 on the first face 51A. Thus, the coolant fluid can be removed at the feed hole 59 placed at the periphery of the plate. In this case, the use of the different polar plates of a stack, imposes alternation in the feeding of each plate with fuel and oxidiser.

It can be seen that in all of these cases, each plate is traversed by the three types of feed aperture, namely fuel, oxidiser and coolant fluid.

Figure 4:
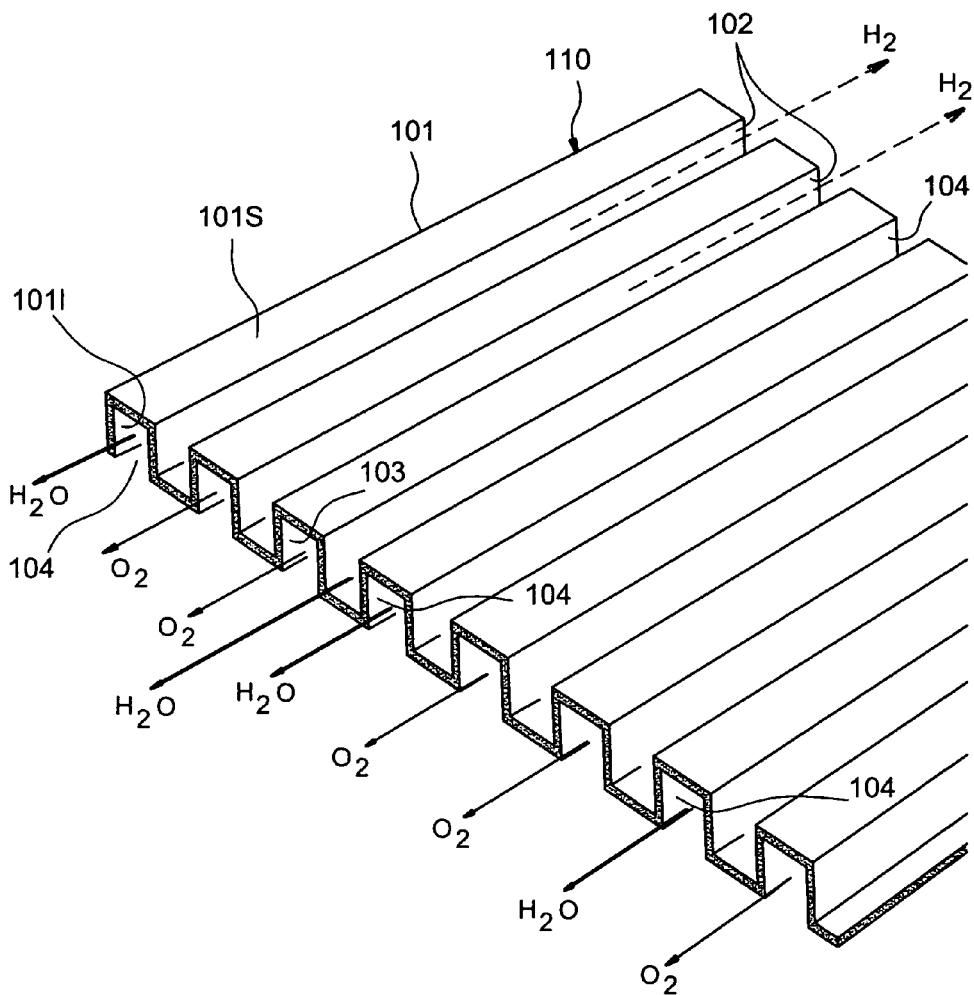
FIG. 4, again in perspective, shows one particular embodiment of the plate according to the invention.

FIG. 4 therefore represents one particular implementation of the feed plate according to the invention since the latter is composed, in the case of its central part, of a corrugated sheet 101. In this implementation, the corrugations are rectilinear and parallel, but this shows only part of the corrugated sheet, and the circulation channels can in fact follow a sinuous or zigzag trajectory.

In fact considering each area 101S and 101I of the corrugated sheet, the corrugations form circulation channels 102, 103 and 104 thus laid out in an alternating manner. In other words, the circulation channels 102 formed on the upper surface 101S correspondent to the separations for two channels 103 and 104 formed on the lower surface 101I. In other words, the circulation channels alternate with the corrugations which separate them.

In this FIG. 4, two first circulation channels 102 have been shown on the upper surface 1S. These have been assigned the role of fuel circulation channels, for the circulation of hydrogen $H_2$. In the case of the circulation channels relating to the lower surface 101I, the figure shows, two first alternating channels for the circulation of oxidiser 103, that is for carrying oxygen $O_2$, with a second channel for circulation of the coolant fluid 4, which is water $H_2O$. Likewise, shown on the upper surface 1S are some second channels for circulation of the coolant fluid 104, namely water.

This embodiment in corrugated sheet form means that the feed plate must be completed by a frame, which is not shown in this FIG. 4, and which has apertures for the feeding of fuel, oxidiser and coolant fluid, in a manner similar to the preceding embodiments.

We have seen the use of a corrugated sheet in FIG. 4, this assuming the use of a metal for creation of the feed plate according to the invention. However, one can well envisage such an implementation in expanded graphite.

The path of the trajectories of the circulation channels in all of the implementations take the form of zigzags. However this is only one form of implementation, when the principle of the invention concerns the placement of channels parallel to each other, and causing them to change direction in a parallel manner. It is thus possible to cover the major part of both faces of each feed plate according to the invention.

In the embodiment of the invention, all of these circulation channels are located in the same plane. Moreover, the oxidiser, the fuel and the coolant fluid are all placed in direct contact with the basic EME elements. In other words, no particular plane is reserved either to the refrigeration, or to the distribution of the fuel and oxidiser gases. On the contrary, just one single zone or layer performs the double function of distributing the oxidiser or fuel and the coolant fluid. Moreover, by grouping together the entrances and the exits, it is possible to design two feed zones in the frame 20 where feed channels can pass to connect to the entrances and exits.

The invention claimed is:

1. A feed plate of at least one fuel cell which includes:
   apertures for the feeding of fuel (3, 30), oxidiser (2, 20) and coolant fluid (4, 40, 54, 59);
   two opposite faces (1A, 1B, 51A, 51B) on at least one of which there are the circulation channels (21, 22, 61) for the fuel or the oxidiser,
   at least one refrigeration channel (41, 53) located on the same face or faces as that with the channels for circulation of the fuel or oxidiser, so as to be coplanar with these first circulation channels,
   wherein the first channels for circulation respectively of the fuel (22) and the oxidiser (21) are located on both faces (1A, 1B) of the plate, with refrigeration taking place on both faces of the plate, so that the plate then constitutes a bipolar plate, with one single refrigeration channel (41) being located on both faces (1A, 1B) and, as a consequence, having several through passages (43, 58) in the plate, from one face to the other, as well as branches, and
   wherein said apertures for feeding of coolant fluid (4, 40, 54, 59) comprise an inlet (4, 54) for the coolant fluid and an outlet (40, 59) for the coolant fluid, said inlet and outlet being in fluid communication with the several through passages (43, 58) via the refrigeration channel (41).

2. A feed plate according to claim 1, wherein the entrance and the exit of the refrigeration channel are positioned on the opposite face in relation to that where the refrigeration channel is located, with the latter passing through the thickness of the plate.

3. A feed plate according to claim 1, the different circulation channels have entrances and exits grouped together at one set position on the plate, as well as apertures for the feeding of oxidiser, fuel and coolant fluid.

4. A feed plate according to claim 1, wherein the trajectories of the circulation channels (21, 22, 61) and of the refrigeration channel or channels (41, 53) are interleaved in relation to each other, and so follow the same path.

5. A feed plate according to claim 1, wherein the trajectory of the circulation channels (21, 22, 61) is of zigzag form.

6. A feed plate according to claim 1, wherein that the refrigeration channel or channels has branches (42, 55) whose entrances and exits are spaced over most of the length of the plate.

7. A feed plate according to claim 1, wherein the trajectory of the circulation channels for the fuel and oxidiser and coolant are parallel with each other, so as to form a comb-like structure.

8. A feed plate according to claim 7, wherein the channel orientation of one face is offset by 90° in relation to the other.

9. A feed plate according claim 6 or 8, wherein the passage through the plate by the refrigeration channel (41) takes place by means of through passages (43) at the end of each branch (42), with a change of orientation through 90° for the refrigeration channel at the passage through the plate.

10. A feed plate according to claim 1, further comprising a corrugated plate (101) so as to form first channels for circulation of the fuel (102) on a first face, interleaved with parallel refrigeration channels (104) on a first face, and second channels for circulation of the oxidiser (103) interleaved with parallel refrigeration channels (104) on the second face, so that the channels on the first face form separations for the channels of the second face and vice versa, with all of the channels being located in the same plane, and the plate thus constituting a bipolar plate.

11. A feed plate of the bipolar type according to claim 10, wherein the plate is a corrugated sheet, possibly surrounded by a frame, pierced by feed apertures.

12. A feed plate according to claim 1, wherein the refrigeration channel or channels (41, 53), or the branches (42, 55, 57), are positioned between several channels (21, 22, 61) for the circulation of oxidiser or fuel.

13. A feed plate according to claim 1, wherein the coolant fluid is water.

14. A feed plate according to claim 12 or 13, wherein the plate is made from a polymer-graphite composite.

15. A feed plate according to claim 1, wherein the through passages (43, 58) connect the branches (42, 55, 57) each with another or with the refrigeration channel (41) or channels (41, 53).

16. A feed plate according to claim 1, wherein the refrigeration channel (41) or channels (41, 53) are positioned between several of the circulation channels.

* * * * *

UNITED STATES PATENT AND TRADEMARK OFFICE
CERTIFICATE OF CORRECTION

PATENT NO. : 7,659,020 B2
APPLICATION NO. : 10/581869
DATED : February 9, 2010
INVENTOR(S) : Nietsch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 697 days.

Signed and Sealed this

Thirtieth Day of November, 2010

David J. Kappos
*Director of the United States Patent and Trademark Office*